2,956,033

LIGNIN-PHENOL-FORMALDEHYDE RESINS, AND METHOD OF PREPARATION

Alfons Apel, 56 Hauptstrasse, Mannheim-Feudenheim, Germany, and Theodor Riehm, 1 Kalmitstrasse, Mannheim, Germany No Drawing. Filed Apr. 19, 1957, Ser. No. 653,744

Claims priority, application Germany Oct. 3, 1952

6 Claims. (Cl. 260—17.5)

The invention relates to lignin-phenol-aldehyde resins.

Various methods have been described to incorporate lignin or lignin products in phenol-aldehyde resins. For many applications, such resins have not been satisfactory because of their high melting point and their quick-setting properties.

It is a principal object of the invention to provide a phenol-aldehyde-lignin resin of improved properties which is suitable for molding compositions and has excellent impregnating properties.

It is another object of the invention to provide a phenol-aldehyde-lignin resin of the novolak type, which is substantially soluble in alcohol.

Other objects and advantages will be apparent from a consideration of the specification and claims.

According to the invention, low temperature lignin, which will be defined below, is condensed with an acid reaction product of phenol and formaldehyde, which contains no, or a very small amount of, free formaldehyde, but an excess of free phenol. When the free phenol remaining after the reaction with lignin is then removed, the resinous end product is an alcohol-soluble novolak type resin.

The term "low temperature lignin," as used in the specification and claims, designates lignin obtained by the hydrolysis of wood and other vegetable materials, which contain lignin and cellulose, by treatment with high concentrated acid, for instance about 39 to 42% HCl at temperatures not exceeding about 30° C. Such lignin is obtained as a waste product in the Bergius saccharification process, which is described in the technical literature.

Lignin obtained by other saccharification methods, for instance in the Madison process, by hydrolysis with dilute acids at higher temperatures, or lignin sulfonic acids and sulfite waste lignins, show in their reaction with phenol-formaldehyde condensation products a behavior entirely different from the behavior of low temperature lignin. Such high temperature lignin reacts only incompletely with phenol; a large part of the phenol is absorbed without chemical reaction, and highly viscous masses are obtained, from which the unreacted phenol can be distilled off only at very high temperatures strongly affecting the properties of the product. The thus obtained resin is unsuitable for molding compositions. We believe that the high reactivity of the low temperature lignin may be explained, at least in part, by the presence of free phenolic and aldehyde groups, which at the higher temperatures, to which the high temperature lignin has been subjected, have been blocked by intramolecular reactions.

Lignin sulfuric acids and similar products are unsuitable for the production of high quality resins, because they contain or form obnoxious impurities; it is not possible to obtain high quality novolak compositions from degraded lignin derivatives.

In carrying out our invention, lignin is reacted at a temperature of about 130 to 160° C., but not exceeding the boiling point of phenol with a phenol-formaldehyde condensation product prepared by reaction of one mole of phenol with less than 1 mole, preferably, .2 to .5 mole, of formaldehyde, in the presence of an acid catalyst at temperatures of about 60 to 100° C. The formaldehyde may be employed in the form of the 30 to 40% solution sold in commerce, or also as para-formaldehyde or trioxymethylene. The lignin reacts with the low molecular resins preformed in said condensation product and in a second step with the freshly added phenol. The amount by weight of lignin condensed into the product is 1 part to about 1.5 to 2.5 parts of phenol, and 1 part to about .1 to .5 part of formaldehyde (100%), that is, the amount of lignin added corresponds to about 2 to 10 times the weight of the formaldehyde (100%) condensed with the phenol. The end product is a novolak type resinous condensation product containing a low temperature lignin-phenol and a phenol-formaldehyde condensation product in a proportion of about 75 to 90:25 to 10 and having a melting point of 70 to 95° C.

Preferably, the phenol required for the reaction with lignin is added only after the water of the formaldehyde solution, and the water of condensation, has been distilled off; it may be applied in excess, so as to act as solvent and to ensure a smooth progress of the reaction.

The aqueous distillate contains a certain amount of phenol, which may be recovered and re-used. A high amount of phenol in the distillate may be avoided by using in the preparation of the phenol-formaldehyde condensation product an excess of formaldehyde, for instance an amount of about 1.5 mole of formaldehyde per 1 mole of phenol; in this case, the reaction is carried out in dilute aqueous solution containing at least about 60 to 90 percent by weight of water. Under these conditions, a low molecular weight resin is precipitated and the supernatant aqueous solution, which contains only negligible amounts of dissolved phenol, can be readily siphoned off or otherwise withdrawn. The remaining resin is then heated to a temperature above 130° C.; fresh phenol and acid as a catalyst are added, and lignin is then condensed into the mass.

The incorporation of the lignin in the recited phenol-formaldehyde precondensation reaction product can be carried out in such a way that dry low temperature lignin in the form of coarse granules or also ground to powder is added within about 30 to 60 min. at temperatures ranging from about 130° C. to the boiling point of the phenolic component. The condensation reaction starts at once and the water of reaction distills off. After all the lignin has been added, the mass if maintained for an additional period of time, for instance about 15 to 60 min. at a temperature above 130° C., and subsequently the excess of phenols and volatile matter is distilled off in vacuo (e.g. at 25 to 60 Torr). In this procedure, an end temperature of 160° C. is hardly harmful.

It is of advantage to neutralize the acid, which has been added as a catalyst, prior to the vacuum distillation.

The new process gives good yields, for instance 150 to 220 percent, of resin calculated on the total consumption of phenol; the resins are distinguished by a lustrous appearance and excellent properties and are in no way inferior to the conventional novolak resins.

The properties of the obtained resins can be further improved by subjecting the resin solutions of low viscosity prior to the final vacuum distillation to an intermediate mechanical purification at temperatures above 100° C. For instance, the resin solution can be filtered under pressure over a filter candle or cleared in a centrifuge of the type conventionally used in the lacquer purification. In this way, it is possible to remove about another 2 percent (calculated on the resin) of difficultly decomposable organic substances introduced with the lignin, which impurities, in spite of their small amount, can impair the quality of the resin because of their porous structure.

Suitable catalysts are mineral acids, such as sulfuric acid, as well as organic acids, for instance oxalic acid, formic acid, and the like. When strong mineral acids, such as sulfuric acid or hydrochloric acid, are used for the preparation of the starting phenol-formaldehyde reaction product, it is of advantage to employ low acid concentrations, for instance not higher than .2 percent, calculated on the reaction product, and to increase the amount of acid, for instance up to about .4 percent, prior to the incorporation of the lignin, whereby the use of non-volatile acids is preferred. When weakly dissociated acids, for instance phosphoric acid or oxalic acid, are used, the catalyst amount for the lignin incorporation is preferably increased to about 1 percent.

In order to produce specific resin qualities, the pre-reaction product of phenols and formaldehyde can be prepared with a less dissociated acid, e.g. phosphoric acid or oxalic acid, and the incorporation of the lignin can be carried out with the addition of a strongly dissociated acid, e.g. sulfuric acid.

The following examples are given to illustrate the method of the invention. All parts are given by weight unless otherwise specified.

Example 1

80 parts of phenol are refluxed with 35 parts of 30% formaldehyde with addition of .5 part of oxalic acid for about 90 min.; subsequently, the water is distilled off. Then 45 parts of phenol and .5 part of sulfuric acid are added, and 60 parts of dry low temperature lignin are introduced with continuous stirring within a period of 30 to 60 min. at 140 to 160° C. and the mixture is maintained at said temperature for further 30 to 60 min. During the incorporation of the lignin and the after-heating, the water of reaction distills off. After the catalyst acid has been neutralized with .9 part of calcium carbonate, the hot resin solution is freed in a centrifuge of organic and inorganic impurities. Subsequently, the volatile matter including the excess of phenol is removed by vacuum distillation. A glossy homogeneous resin is obtained, which in the same way as Novolak can be readily processed to molding compositions containing, e.g. 40 percent of resin. The resin yield is 175 percent, calculated on the phenol consumption.

If this example is repeated under the same conditions, except that the low temperature lignin is replaced by high temperature lignin obtained in the wood hydrolysis according to the Madison process by treatment with dilute sulfuric acid of 180° C., much less water of reaction is generated. If it is attempted to incorporate 60 parts of high temperature lignin, the mass gels to a thick paste already after addition of 30 parts of said lignin, and homogeneous introduction of further lignin becomes impossible. The excess phenol absorbs the lignin without reacting therewith, and as it has become impossible to stir the thick paste, the phenol cannot be distilled off without overheating the entire mass. The procedure must be discontinued because no resin is formed.

Example 2

80 parts of phenol are refluxed with 110 parts of 30% formaldehyde and 400 parts of water with addition of 2 parts of sulfuric acid for 75 min. After cooling to 50° C. the supernatant solution is syphoned off and the remaining liquid reaction product is heated to remove the residual water. After addition of 80 more parts of phenol and .7 part of sulfuric acid, 80 parts of dry low temperature lignin are incorporated with continuous stirring at 140 to 160° C. and subsequently the mixture is kept for 30 to 60 more minutes at reaction temperature. The water of reaction distills off during the admixture of the lignin and the after-heating. After neutralization of the acid with 1.2 parts of calcium carbonate, the hot resin solution is, like in Example 1, freed of impurities, and the volatile substances and the excess of phenol are distilled off under reduced pressure.

Example 3

110 parts of phenol are refluxed with 90 parts of formaldehyde (30%) at 100° C. with addition of 1.6 parts of oxalic acid until the reflux was substantially free of formaldehyde, which takes about 2 hours. Then, the water is distilled off, whereby the temperature rises slowly to about 140° C. After addition of further 400 parts of phenol and 3 parts of sulfuric acid, 100 parts of low temperature lignin are incorporated into the solution with continuous stirring at a temperature of 140–160° C. within 45 minutes. After the introduction of the lignin is completed, the reaction mixture is maintained for 1 more hour at 150–160° C., and then the excess phenol is distilled off in vacuo (at 30 Torr).

The residue consists of 300 parts of resin, corresponding to a yield of 150 percent, calculated on consumed phenol.

The resin consists of 65.3 parts of phenol, 3.5 parts of formaldehyde equivalent (=methylene groups, corresponding to 8.7 parts of 100% formaldehyde), and 31.2 parts of low temperature lignin; it has a melting point (Krämer-Sarnow method) of 73° C. and an alcohol solubility of 99.1%.

Molding compositions containing a maximum content of 40 percent of the obtained resin are readily homogenized on differential rolls at 125 to 135° C., and the kneading time is about 4 minutes. On molding such compositions at 170 to 190° C., the flow characteristics are the same as those of molding compositions prepared from conventional phenol novolaks and are fully satisfactory. The molded specimens have a glossy surface, and good mechanical and dielectric strength.

If the low temperature lignin is replaced by high temperature lignin, similar results are obtained as set forth above in the description of the comparative tests with respect to Example 1. It is not possible to incorporate more than 60 parts of such lignin, and no useful resin is obtained.

If the low temperature lignin is not reacted with a phenol-formaldehyde precondensation but first with phenol and subsequently with formaldehyde, or in a single step with phenol and formaldehyde, resins are obtained which do not show the good properties of resins obtained according to the particular two-step process according to the invention.

This is shown by the following tests, in which the same amounts of components as in Example 3 were reacted, but under different conditions.

Example 3(a)

100 parts of lignin are added to 510 parts of phenol, containing 3 parts of sulfuric acid as catalyst, at 140 to 160° C. within 45 minutes with continuous stirring. Subsequently, the reaction mixture is maintained an additional 60 minutes at 130 to 160° C. and then cooled to about 60 to 65° C. After neutralizing the sulfuric acid by addition of 1.5 parts of calcium carbonate, 90 parts of formaldehyde (30%) and 3 parts of oxalic acid are added; the mixture is slowly heated up to 100° C. and refluxed, thereby causing condensation. After about 2 to 2½ hours, the reaction is completed as shown by the substantial absence of formaldehyde in the reflux water. Then the water is distilled off at normal pressure, whereby the temperature of the reaction mixture rises slowly to 140° C.; finally, the excess phenol is recovered by distillation in vacuo (30 Torr). 270 parts of resin are obtained, corresponding to a yield of about 160%, calculated on consumed phenol.

The obtained resin had the following properties:

Melting point (Krämer-Sarnow) _____ ° C__ 93
Solubility in alcohol _____percent__ 90.2

Example 3(b)

A mixture of 100 parts of lignin, 510 parts of phenol, and 90 parts of formaldehyde (30%), to which 3 parts of oxalic acid have been added, are refluxed with vigorous stirring at about 100° C. After about 2 hours, the formaldehyde reaction in the reflux water has substantially disappeared; 3 parts of sulfuric acid are added and then the water is distilled off, whereby the temperature rises gradually to about 140 to 150° C. The reaction mixture is kept for one more hour at 150–160° C., and then the excess phenol is recovered by vacuum distillation at 30 Torr. 200 parts of resin are obtained, corresponding to a yield of 163%, calculated on consumed phenol. Melting point (Krämer-Sarnow) 97° C.; solubility in alcohol 88.7%.

If resins obtained according to Examples 3(a) and 3(b) are processed to molding compositions, such compositions containing at least 50% of resin can still be homogenized on mixing rolls at 125 to 135° C. The milling time is 1 to 2 minutes, then the material falls off. If such compositions are molded at 170 to 190° C., their flow properties are inferior to those of conventional phenol novolaks and insufficient for normal molding operations.

In contradistinction to the resins obtained according to Examples 3(a) and 3(b), the resins made according to the invention, that is: according to Examples 1 to 3, have excellent properties. They are substantially completely soluble in alcohol, acetone and alkali; no methoxy groups can be analytically found, which is evidence that all lignin has been reacted. The melting point, determined by the Krämer-Sarnow method, is about 70 to 95° C. and depends on the content of lignin and free phenol; the higher the lignin content, the higher is the melting point, whereas a content of free phenol decreases the melting point. The ash content introduced by the lignin is about .5 to .6 percent (about .2 percent of Fe in the form of $Fe_2O_3$). The specific gravity is of the order of magnitude of about 1.27 g./cm.$^3$.

By the addition of hexamethylene tetramine, said lignin-phenol-formaldehyde condensation products are converted to thermo-setting resin compositions similar to resins of the phenol-resol type. They have then a nitrogen content corresponding to the hexamethylene tetramine content. The hexamethylene tetramine is added by grinding and milling it with the resin or by incorporating it into the molten resin.

The properties of such thermo-setting compositions can be adjusted by the amount of the introduced hexamethylene tetramine, which may be the smaller, the finer the distribution thereof is in the novolak. The minimum amount will be about 10 percent.

The following example illustrated the preparation of a molding composition:

Example 4

In a first step, 405 parts of phenol, 336 parts of formaldehyde (30%), 6.45 parts of oxalic acid dissolved in 15 parts of hot water, are refluxed in the reaction vessel, and, after the reaction has started, maintained for 2.5 hours in a slight boil. Subsequently, water is distilled off at atmospheric pressure. The formed novolak is diluted with 439 parts of phenol and heated to 150° C.

In a second step, a charge consisting of 200 parts of dry low temperature lignin, 200 parts of phenol and 24 parts of sulfuric acid is added to the product of step 1 at such a rate corresponding to the rate of solution of the lignin. In this way, any formation of clots is prevented. In larger batches, the introduction is terminated in about ¾ to 1 hour. The mass is maintained for two more hours at 150–160° C., whereby the water of reaction is distilled off. Subsequently, it is subjected to distillation at reduced pressure to recover the excess phenol; it is terminated as soon as a final temperature of 145–150° C. has been reacted, for instance 145° C. at 30 mm. Hg.

786 parts of resin are obtained with a lignin content of 25.5 percent. The softening point is 70° C., the melting point 79° C. (Krämer-Sarnow). Solubility in alcohol 99%. Free phenol 5.4%. The distillate of the first step contained .66% of formaldehyde and about 4% of free phenol.

The thus obtained novolak was compounded to molding compositions containing 40 or 50 percent, respectively, thereof, as follows:

|  | 40% | 50% |
|---|---|---|
| Novolak | 11.4 | 13.3 |
| Hexamethylene tetramine | 1.71 | 2.0 |
| Wax | .03 | .03 |
| Stearic acid | .15 | .15 |
| Aluminum stearate | .06 | .06 |
| Magnesia usta | .30 | .30 |
| Calcium hydroxide | .15 | .15 |
| Soft wood flour | 9.0 | 7.5 |
| Hard wood flour | 9.0 | 7.5 |

The resin and hexamethylene tetramine may be employed in the finely ground state. We prefer to mill the resin with moist hexamethylene tetramine and the other ingredients for a short time and then blend it, without fine milling, with the wood flour. In this way, the quality of the molding composition is considerably improved. The ratio of soft wood to hard wood may be modified according to the use of the molding composition.

The properties of the compositions may also be modified by a heat treatment of the mixture of the lignin phenol-formaldehyde resin with the hexamethylene tetramine, whereby free phenol forms the addition compound hexamethylene tetramine triphenol, which is converted with the novolak, or also without the same, into resol type resins.

The novolak-hexamethylene tetramine mixture when subjected to a preliminary heat treatment, splits off ammonia and forms resol type resins. This reaction can be accelerated by catalytic agents, such as alkaline earth compounds, cyclic amines, for instance: aniline salts and others.

In this way, it is possible to prepare from the basic lignin-phenol-formaldehyde resins a series of compositions adapted to specific industrial applications, for instance for molding compositions corresponding to the German standard type 31, and for the preparation of foundry sands for the Croning shell molding process. For the latter application, resins according to the invention have particular advantages because they do not fume and do not present health hazards. They allow manufacture of large castings.

Other useful applications are as adhesives for the manufacture of laminated fiber boards and as components of ion exchange systems.

This application is a continuation-in-part of our copending application, Serial No. 383,686, filed October 1, 1953, now abandoned.

We claim:

1. A process for the preparation of alcohol soluble phenol-formaldehyde-lignin resins wherein the lignin is substantially bound to phenol, comprising heating low temperature lignin, which has been obtained in the acid hydrolysis of lignin-containing cellulosic substances at temperatures not substantially exceeding 30° C., at temperatures of 130 to 160° C. with a solution containing a precondensed phenol-formaldehyde condensation product and free phenol until said lignin has substantially completely reacted with said free phenol, and removing the water of reaction and unreacted free phenol, the amounts of lignin, free phenol and phenol-formaldehyde condensation product being so adjusted that their proportions in the end product in parts by weight are about 1 part of lignin, 1.5 to 2.5 parts of phenol, .1 to .5 part of formaldehyde (100%); and the lignin component does not exceed 40 percent.

2. A process for the preparation of alcohol soluble phenol-formaldehyde-lignin resins comprising refluxing 1 mole of phenol with an aqueous formaldehyde solution containing about .2 to .5 mole of formaldehyde at a temperature of about 60 to 100° C. to form a phenol-formaldehyde condensation product, heating the solution containing said phenol-formaldehyde condensation product and free phenol at a temperature of about 130 to 160° C., adding at said temperature low temperature lignin which has been obtained in the acid hydrolysis of lignin containing cellulosic substances at temperatures not exceeding about 30° C., in an amount by weight corresponding to about 2 to 10 times the weight of the formaldehyde (100%) condensed with said phenol, maintaining the batch at said temperature until the lignin has been substantially reacted with phenol, and distilling off excess phenol under reduced pressure.

3. The process as claimed in claim 2, comprising adding to said refluxed solution, prior to the addition of said low temperature lignin, phenol in an amount exceeding the amount required for the subsequent reaction with said lignin.

4. A process for the preparation of alcohol soluble phenol-formaldehyde-lignin resins wherein the lignin is substantially bound to phenol, comprising boiling a dilute aqueous solution containing 1 mole of phenol and more than one, up to about 1.5 moles of formaldehyde until the phenol has been substantially reacted with the formaldehyde to form a phenol-formaldehyde condensation product, separating said condensating product from the water, adding phenol to said condensation product, heating the mixture to about 130 to 160° C., adding to said heated mixture low temperature lignin which has been obtained in the acid hydrolysis of lignin-containing cellulosic substances at temperatures not substantially exceeding 30° C., maintaining the mixture at said temperature until said lignin has substantially completely reacted with said phenol, and distilling off the unreacted phenol under reduced pressure, the amount of lignin, free phenol, and phenol-formaldehyde condensation product being so adjusted that their proportions in the end product in parts by weight are about 1 part of lignin, 1.5 to 2.5 parts of phenol, .1 to .5 part of formaldehyde (100%), and the lignin component does not exceed 40 percent.

5. A substantially alcohol soluble lignin-phenol-formaldehyde resinous novolak type condensation product obtained by the process claimed in claim 2 and containing a phenol condensation product with low temperature lignin obtained by the acid hydrolysis of lignin-containing cellulosic substances at temperatures not substantially exceeding 30° C., and a phenol-formaldehyde condensation product in a proportion of about 75 to 90:25 to 10, said resinous condensation product having a melting point of 70 to 95° C.

6. A heat hardenable resinous composition containing the condensation product claimed in claim 5 with at least 10 percent, calculated on the composition, of hexamethylene tetramine.

References Cited in the file of this patent

UNITED STATES PATENTS

| | | |
|---|---|---|
| 2,197,724 | Hovey et al. | Apr. 16, 1940 |
| 2,357,090 | D'Alelio | Aug. 29, 1944 |